United States Patent
Coiffic et al.

(10) Patent No.: US 8,202,496 B2
(45) Date of Patent: Jun. 19, 2012

(54) SEPARATION DEVICE OF MOLECULES AND PRODUCTION METHOD THEREOF

(75) Inventors: Jean-Christophe Coiffic, Grenoble (FR); Frédéric-Xavier Gaillard, Voiron (FR); Pierre Puget, Saint Ismier (FR)

(73) Assignee: Commissariat a l'Energie Atomique, Paris (FR)

( * ) Notice: Subject to any disclaimer, the term of this patent is extended or adjusted under 35 U.S.C. 154(b) by 187 days.

(21) Appl. No.: 12/379,468

(22) Filed: Feb. 23, 2009

(65) Prior Publication Data

US 2009/0218226 A1   Sep. 3, 2009

(30) Foreign Application Priority Data

Feb. 28, 2008   (FR) .................................. 08 01098

(51) Int. Cl.
*B01D 21/00* (2006.01)
*G01N 30/02* (2006.01)

(52) U.S. Cl. ......... 422/527; 422/68.1; 422/70; 422/500; 422/502; 422/504; 422/534; 422/535; 436/161; 209/634; 209/659; 977/700; 977/701; 977/707; 977/781; 977/782; 977/809; 977/811; 977/842

(58) Field of Classification Search .................. 422/68.1, 422/70, 101, 500, 502–504; 436/161; 209/634, 209/659; 977/734, 742, 781, 782, 788, 809, 977/811, 813, 815, 842, 843, 844, 700, 701, 977/707

See application file for complete search history.

(56) References Cited

U.S. PATENT DOCUMENTS

| | | | |
|---|---|---|---|
| 7,290,667 B1 * | 11/2007 | Bakajin et al. ................ 210/503 |
| 7,416,699 B2 * | 8/2008 | Dai et al. .................... 422/82.02 |
| 7,871,570 B2 * | 1/2011 | Huang et al. ................. 422/68.1 |
| 2003/0119034 A1 * | 6/2003 | Kang et al. ........................ 435/6 |
| 2003/0203491 A1 * | 10/2003 | Andrevski et al. ............. 436/46 |
| 2004/0262636 A1 * | 12/2004 | Yang et al. ..................... 257/200 |

(Continued)

FOREIGN PATENT DOCUMENTS

EP   1 340 544 A1   9/2003

(Continued)

OTHER PUBLICATIONS

B.R. Flachsbart, et al. Design and Fabrication of a Multilayered Polymer Microfluidic Chip with Nanofluidic Interconnects via Adhesive Contact Printing. Lab on a Chip (May 2006); 6(5): 667-674. See abstract; p. 667, col. 2, both paragraphs, running onto p. 668, cols. 1 and 2.*

(Continued)

*Primary Examiner* — Brian R Gordon
(74) *Attorney, Agent, or Firm* — Oliff & Berridge, PLC (57) ABSTRACT

A molecule is separated from a liquid sample containing said molecule and at least one additional molecule having a larger hydrodynamic diameter than the hydrodynamic diameter of the molecule to be separated, by means of a separation device comprising a substrate, at least one circulation channel arranged in said substrate, and at least one nanotube associated with said molecule to be separated and formed on a free surface of the substrate. Separation is achieved by means of the internal channel of a nanotube, such as a carbon nanotube, presenting an effective diameter chosen in predetermined and controlled manner. The effective diameter of the internal channel is chosen such as to be larger than the hydrodynamic diameter of the molecule to be separated and smaller than the hydrodynamic diameter of the additional molecules of larger hydrodynamic diameters.

11 Claims, 5 Drawing Sheets

U.S. PATENT DOCUMENTS

| | | | |
|---|---|---|---|
| 2005/0167655 A1* | 8/2005 | Furukawa et al. | 257/20 |
| 2006/0278580 A1* | 12/2006 | Striemer et al. | 210/650 |
| 2007/0225532 A1* | 9/2007 | Tonkovich et al. | 585/444 |
| 2008/0187648 A1* | 8/2008 | Hart et al. | 427/8 |
| 2008/0283497 A1 | 11/2008 | Gaillard et al. | |
| 2008/0317631 A1* | 12/2008 | Farrow et al. | 422/68.1 |
| 2009/0283751 A1* | 11/2009 | Yang et al. | 257/24 |
| 2010/0044679 A1* | 2/2010 | Buh et al. | 257/24 |
| 2010/0144104 A1* | 6/2010 | Okita | 438/197 |
| 2010/0203521 A1* | 8/2010 | Klapperich et al. | 435/6 |
| 2011/0112348 A1* | 5/2011 | Tonkovich et al. | 585/435 |
| 2011/0237000 A1* | 9/2011 | Tey et al. | 436/518 |
| 2011/0287977 A1* | 11/2011 | Cai et al. | 506/13 |

FOREIGN PATENT DOCUMENTS

| | | |
|---|---|---|
| FR | 2 916 303 A1 | 11/2008 |
| WO | WO 2007/025104 A2 | 3/2007 |
| WO | WO 2008/039579 A2 | 4/2008 |

OTHER PUBLICATIONS

Y.-C. Wang, et al. Million-Fold Preconcentration of Proteins and Peptides by Nanofluidic Filter. Analytical Chemistry (Jul. 15, 2005); 77(14): 4293-4299. See Fig. 1.*

T.-C. Kuo, et al. Gateable Nanofluidic Interconnects for Multilayered Microfluidic Separation Systems. Analytical Chemistry (Apr. 15, 2003); 75(8): 1861-1867. See Figs. 1, 7.*

S. Yu, et al. Size-Based Protein Separations in Poly(ethylene glycol)-Derivatized Gold Nanotubule Membranes. Nano Letters (Aug. 3, 2001); 1(9): 495-498. See p. 498, col. 1, last paragraph, first sentence.*

Nerushev et al., "Carbon nanotube films obtained by thermal chemical vapour deposition", *Journal of Materials Chemistry*, Mar. 6, 2001, Gothenburg, Sweden.

Eljkel et al., "The promise of nanotechnology for separation devices-from a top-down approach to nature-inspired separation devices", *Electrophoresis Journal*, Enschede, The Netherlands, 2006, vol. 27, pp. 677-685.

Fu et al., "A patterned anisotropic nanofluidic sieving structure for continuous-flow separation of DNA and proteins", *Nature Nanotechnology*, Feb. 2007, vol. 2, Cambridge, MA, pp. 121-128.

Striemer et al., "Charge- and size-based separation of macromolecules using ultrathin silicon membranes", *Nature*, vol. 445, Feb. 15, 2007, Rochester, NY, pp. 749-753.

Karnik et al., "Field-effect control of protein transport in a nanofluidic transistor circuit", *Applied Physics Letters*, vol. 88, Mar. 24, 2006, Berkley, California, pp. 123114-123114-3.

Sato et al., "Novel approach to fabricating carbon nanotube via interconnects using size-controlled catalyst nanoparticles", *IEEE*, 2006, Atsugi, Japan, pp. 230-232.

Teo et al., "Plasma enhanced chemical vapour deposition carbon nanotubes/nanofibres—how uniform do they grow?", *Nanotechnology*, vol. 14, Cambridge, UK, pp. 204-211, Jan. 2003.

* cited by examiner

SEPARATION DEVICE OF MOLECULES AND PRODUCTION METHOD THEREOF

BACKGROUND OF THE INVENTION

The invention relates to a separation device of at least one molecule from a liquid sample containing said molecule to be separated and at least one additional molecule having a larger hydrodynamic diameter than the hydrodynamic diameter of the molecule to be separated.

The invention also relates to a method for producing a separation device.

STATE OF THE ART

Separation techniques have always been important, in particular in the field of agriculture, food processing, metallurgy, extraction of colorants, perfumes or active principles for medicine and pharmacy.

Separation techniques are used nowadays not only for producing particular products, but also for analytical purposes or for acquiring information on the composition or the properties of a mixture.

In the particular field of biology and health, the ability to separate increasingly complex mixtures is an issue of paramount importance.

For example, in the field of proteomics, a discipline in which one of the experimental approaches is based on the use of a mass spectrometer to identify interesting proteins (also called proteins of interest), it may be necessary to resort at a prior stage to one or more separation steps, for example by electrophoresis on acrylamide gel, on single- or two-dimensional gel or by liquid chromatography. In certain cases, the mass spectrometer cannot in fact process a raw biological sample.

Diagnosis of certain diseases, such as cancer, also requires detection and/or titration of certain markers in the patient's blood. These markers are in general particular proteins, and detection of the latter requires an analysis protocol to be carried out, the first steps of which sometimes consist of several separation steps.

Likewise, certain therapies are based on elimination and therefore separation of certain toxic compounds which accumulate in the blood. This is the case in particular of blood dialysis for patients suffering from various kidney lesions.

One of the recurrent requirements of biological analysis means does however involve their ability to process samples of small size. In the diagnostics field, this in fact enables samples to be taken in the least invasive possible manner (blood sample for example, or biopsy). In the case of increasingly early screening or treatment of cancers, it can also be sought to analyze tumours of increasingly small size. In the life science research field, there is also a need to study the properties of proteins present in very small quantities or present in individualized cells or even in particular organelles.

A large number of separation techniques suitable for processing biological samples exist. These techniques are based on different physico-chemical principles and for each of them the treated molecules are discriminated by different properties. For example, the following properties can be implemented:

the size of the molecules, which conditions not only the ability of said molecules to migrate through the pores of a membrane, but also the friction force exerted by the medium on the molecule when the latter is in motion, and also the diffusion constant of the molecule in the medium (which conditions its movement called Brownian movement), the electrostatic charge of the molecule. Biological molecules are in general weak acids (nucleic acids, proteins formed by amino-acids) that are ionized at different degrees according to the pH of the solution. The charge of the molecules of interest therefore varies in general according to the pH, a chemical potential which expresses the affinity of the molecules of interest for another substance. These affinities may arise from several types of intermolecular forces—Van der Waals, electrostatic, hydrophilic/hydrophobic, steric, or entropic interactions. Specific biological interactions can be considered as being combinations of all these forces.

the conformation and conformation dynamics of the molecule. Biological molecules are in general poly- or oligomers that have a given conformation that is more or less fixed. In certain complex media (gels for example), for a given size, the ability of certain molecules to reconfigure spatially may enable them to move more or less easily in these media.

The most commonplace separation techniques are the different forms of electrophoresis (on one- or two-dimensional gel, capillary) and the different forms of liquid chromatography, filtration, dialysis, centrifugation.

Certain of these techniques are however not suitable for processing samples of very small size or for separation of objects smaller than a few tens of nanometers (characteristic size of a molecule). This is for example the case of centrifugation.

Consequently, a large number of research work over the past few years has consisted in producing separation devices using techniques originating from the micro- and nanotechnologies field so as to be able to process samples of very small size or volume. The attractiveness of these devices is to be found in particular in the possibility of producing structures presenting characteristic dimensions corresponding to the size of the molecules of interest, and of doing this in a particularly well-controlled manner.

For example, Jan C. T. Eijkel et al. in the article "The promise of nanotechnology for separation devices—from a top-down approach to nature-inspired separation devices" (Electrophoresis 2006, 027, 677-685) review the possible applications of nanotechnologies to optimize existing separation methods and to provide new methods. Jan C. T. Eijkel et al. describe for example micro- and nano-structured columns for HPLC, micro- and nano-structured sieving structures, and so on.

In the article "A patterned anisotropic nanofluidic sieving structure for continuous-flow separation of DNA and proteins" (Nature Nanotechnology, Vol 2, February 2007), Jianping Fu et al. report fabrication of two-dimensional sieving structures by means of conventional microelectronics techniques to improve the speed and resolution of biomolecule separation. The sieving structures are achieved by etching in a silicon substrate by means of photolithography and Reactive-Ion Etching (RIE) techniques, enabling controlled maskwork to be obtained with under-the-micron precision. The flat sieving structures comprise parallel main channels with a width of 1 μm and a depth of 300 nm, connected to one another by lateral channels with a width of 1 μm and a depth of 55 nm. Movement of molecules, such as DNA molecules and proteins, is created by superposition of a longitudinal electric field in the direction of the main channels and a lateral electric field in the direction of the lateral channels, the latter being less deep than the main channels. The separation effect in such structures arises from the fact that different molecules have a different probability of migrating from one main channel to another via lateral channels.

In the article "Charge- and size-based separation of macromolecules using ultrathin silicon membranes" (Nature, Vol 445, 15 Feb. 2007), Christopher C. Striemer et al. present an ultrathin nanoporous membrane produced by methods conventionally used in the microelectronics field. The mean size of the pores of the membrane is adjusted by varying a temperature parameter during the fabrication process.

In the case of a sieve structure or of a nanoporous membrane, migration of a biological molecule in a pore or in a channel is conditioned not only by the size of the pore or channel but also by the electrostatic potential applied to the walls delineating the pore or channel. In both these cases, the potential is however static, which does not enable the probability of passing to be dynamically controlled. The article "Field-effect control of protein transport in a nanofluidic transistor circuit" (Applied Physics Letters 88, 123114 (2006)) by Rohit Karnik et al. describes a fabrication where, like a transistor, a variable potential is applied to the surface of a capillary (the latter acting as transistor channel for the carriers). The authors show that they can thereby dynamically control passage of proteins in the channel. This principle is applicable provided that the size of the capillary remains around the Debye length at the surface of the materials, i.e. less than around ten nanometers.

The separation devices currently proposed in the different studies for separating biological molecules present the major drawback of being difficult to produce industrially as they are costly to fabricate. They do in fact require the use of lithography steps which prove very expensive to produce pores or channels of a dimension corresponding to the size of a molecule of interest.

OBJECT OF THE INVENTION

The object of the invention is to provide a separation device that is simple and easy to implement, enabling at least one molecule with a hydrodynamic diameter less than or equal to a few hundred nanometers, in particular a biological molecule, to be efficiently separated from a liquid sample containing said molecule to be separated and at least one additional molecule having a larger hydrodynamic diameter than the hydrodynamic diameter of the molecule to be separated.

According to the invention, this object is achieved by the fact that the device comprises:
a substrate,
at least one circulation channel arranged in said substrate,
and at least one nanotube associated with said molecule to be separated and formed on a free surface of the substrate, said nanotube comprising an internal channel opening out into said circulation channel and presenting a preset effective diameter that is larger than the hydrodynamic diameter of the molecule to be separated and smaller than the hydrodynamic diameter of the additional molecule.

It is a further object of the invention to provide a simple to implement and inexpensive method for producing a separation device of at least one molecule from a liquid sample containing said molecule to be separated and at least one additional molecule having a larger hydrodynamic diameter than the hydrodynamic diameter of the molecule to be separated.

According to the invention, this object is achieved by the fact that the method comprises the following successive steps:
controlled formation of at least one nanotube associated with said molecule to be separated on the free surface of a substrate formed by a material that is degradable by the action of a chemical agent, said nanotube comprising an internal channel presenting a predefined effective diameter that is larger than the hydrodynamic diameter of the molecule to be separated and smaller than the hydrodynamic diameter of the additional molecule,
formation of a thin layer impermeable to the chemical agent, on the free surface of the substrate and on the free surface of said nanotube,
and introduction of the chemical agent into the internal channel of the nanotube and selective degradation of a predetermined zone of the substrate to form a circulation channel.

BRIEF DESCRIPTION OF THE DRAWINGS

Other advantages and features will become more clearly apparent from the following description of particular embodiments of the invention given for non-restrictive example purposes only and represented in the accompanying drawings, in which.

DESCRIPTION OF PARTICULAR EMBODIMENTS

At least one molecule, in particular a biological molecule, is separated or extracted from a liquid sample containing said molecule and at least one additional molecule having a larger hydrodynamic diameter than the hydrodynamic diameter of the molecule to be separated, by means of a separation device comprising:
a substrate,
at least one circulation channel arranged in said substrate,
and at least one nanotube associated with said molecule to be separated and formed on a free surface of the substrate.

The hydrodynamic diameter (also noted Dh) corresponds to the real size (or diameter) of the molecule added to the Debye length, noted $\lambda_D$. The Debye length corresponds to the thickness of the electric double layer surrounding the molecule when the latter is charged. The Debye length corresponds in particular to the thickness of the counter-ion cloud locally balancing the charge of a molecule when the latter is charged and contained in a buffer solution of salt water. It depends on the conditions of the solution comprising the molecule or molecules, in particular on the type and concentration of electrolyte(s) present and on the temperature.

The molecule or molecules designed to be separated or extracted from a liquid sample generally have a hydrodynamic diameter (also noted Dh) of about a few tens of nanometers and more particularly comprised between 1 nm and 1 μm. For example, the molecule or molecules to be separated from a liquid sample can be bovine serum albumin molecules (also noted BSA) with a hydrodynamic diameter $Dh_{BSA}$ of 6.8 nm and/or immunoglobulin molecules (also noted IgG) with a hydrodynamic diameter $Dh_{IgG}$ of 14 nm.

Separation is more particularly performed by means of a channel formed by the internal channel of a nanotube, such as a carbon nanotube, formed on the free surface of a substrate. The internal channel of the nanotube moreover opens out into a circulation channel.

The internal channel of the nanotube presents an effective diameter $d_e$ chosen in predetermined and controlled manner. The effective diameter $d_e$ of the internal channel is defined by the following formulae:

$d_e = d_r - 2\lambda_D$, where $d_r$ corresponds to the actual diameter of the internal channel, i.e. the diameter of the cross-section delineated by the inside wall of the nanotube, and $\lambda_D$ corresponds to the Debye length, when the nanotube and the molecule are electrostatically charged by charges of the same sign, $d_e = d_r$, in the other cases, in particular when the nanotube and molecule are of opposite signs or when they are not charged.

The effective diameter $d_e$ of the channel is in fact chosen so as to only let the molecule with which it is associated pass, and it is more particularly chosen according to the hydrodynamic diameter Dh of the molecule to be separated. It is therefore larger than the hydrodynamic diameter of the molecule to be separated and smaller than that of the additional molecule. The effective diameter can advantageously be comprised between 1 nm and 100 nm.

For example, an internal channel of a nanotube having an effective diameter of 12 nm enables BSA molecules ($Dh_{BSA}$ of 6.8 nm) to be extracted from a solution also containing IgG molecules ($Dh_{IgG}$ of 14 nm).

Furthermore, the effective diameter $d_e$ of the internal channel, the hydrodynamic diameter Dh of a molecule and the relation between the two diameters $d_e$ and Dh depend on the electrostatic charge of the molecule and on the electrostatic charge of the internal channel.

For example, a positively-charged internal channel can block positively-charged molecules if the effective diameter of the internal channel, taking the Debye length into account, is larger than the hydrodynamic diameter of said molecule. If on the other hand the internal channel and the molecule are charged by charges of opposite signs, the hydrodynamic diameter of the molecule simply has to be smaller than the real diameter $d_r$ of the internal channel of the nanotube.

The surface of the internal channel can thus more particularly be functionalized to be electrostatically charged in controlled manner, which enables the probability of molecule passing to be increased or decreased.

Furthermore, the electrostatic charge of the molecule depends on the pH of the solution. It is thus possible to adjust the pH of the solution according to the charge required for the molecule, which also enables the passage of the molecule to be increased or decreased. For example, a BSA molecule reaches a charge of 13e⁻ at a pH equal to 7 and can therefore not pass through a negatively charged internal channel with a real diameter equal to 10 nm.

Depending on the use of the circulation channel, the latter can also comprise an inlet hole and/or an outlet hole so as to enable the liquid sample to circulate or to remove the molecule once the latter has been extracted.

Separation can thereby be effected by injecting the liquid sample into the circulation channel. In this case, only the molecule to be separated or to be extracted can pass the internal channel formed by the nanotube and be recovered at the free end of the nanotube. The circulation channel moreover has a width and/or a height (or a diameter in the case of a circulation channel of circular cross-section) that is larger than or equal to the real diameter of the internal channel of the nanotube. Advantageously, the circulation channel has a width and/or a height smaller than or equal to a few hundred micrometers and more particularly comprised between 5 nm and 100 μm. However the maximal value of the width of the circulation channel is not necessarily critical. The width of the circulation channel can for example be several centimeters in order to increase the flowrate, in particular for samples of very large volume or for separations performed continuously. In an alternative embodiment, the liquid sample can be disposed on the free surface of the substrate at a higher level than that corresponding to the height of the nanotube so as to allow the molecule associated with the nanotube to enter the internal channel of this nanotube. The extracted molecule is then removed by the circulation channel.

A separation device comprising a channel, advantageously of nanometric size and formed by the internal channel of a nanotube such as a carbon nanotube, presents the advantage of being easy to implement, while at the same time being dependable and very efficient. Indeed, the dimensions of such an internal channel are perfectly mastered and controlled in the separation device fabrication process, and more particularly when the nanotube is produced. Furthermore, the separation device can be produced in reproducible manner. Instead of comprising a single nanotube, the device can also comprise a plurality of nanotubes, which enables more complex separations to be performed while at the same time keeping a device that is very simple to produce. The device can comprise nanotubes having internal channels of identical real diameters and/or internal channels of different real diameters in order to separate different molecules.

Such a device is advantageously achieved by a production method that is simple and quick to implement associating controlled formation of at least one carbon nanotube and use of the internal channel of the carbon nanotube formed to produce the circulation channel in the substrate.

FIGS. 1 to 7 represent, for example purposes, different steps of fabrication of a particular embodiment of a separation device 1. For reasons of clarity, the separation device represented in FIGS. 1 to 7 and described below comprises a nanotube and more precisely a carbon nanotube. Naturally, the different steps described for formation of a single nanotube are easily transposable to production of a plurality of nanotubes of identical or different diameters.

Figure 1:
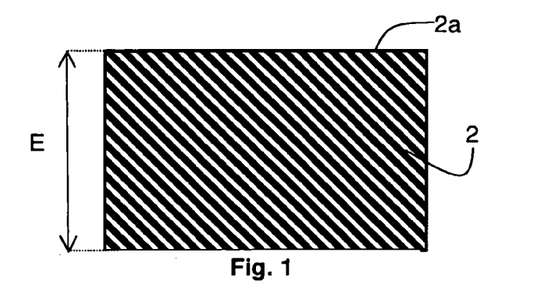
FIGS. 1 to 7 schematically represent in a first embodiment different steps of production of a separation device according to the invention, in cross-section.
Figure 2:
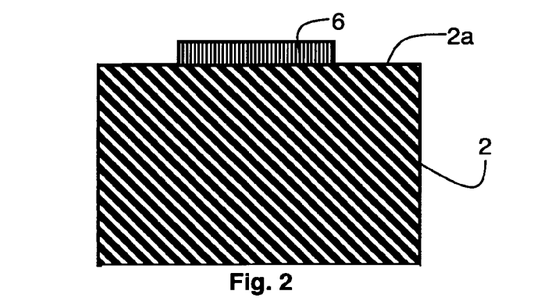

Separation device 1 is made from a substrate 2 as represented in FIG. 1. Substrate 2 is, in this embodiment, formed by a material that is degradable by the action of a chemical agent. For example, the substrate is made from silicon oxide and the chemical agent is hydrofluoric acid (HF). In addition, the height of the circulation channel being dependent on the thickness E of substrate 2, the latter is advantageously comprised between 5 nm and 1 mm.

As represented in FIGS. 1 to 4, a carbon nanotube 3 is produced in controlled manner on the free surface 2a of substrate 2.

Controlled formation of carbon nanotube 3 consists in particular of controlling the diameter D of carbon nanotube 3 and more particularly the real diameter $d_r$ (hereafter noted diameter $d_r$) of internal channel 4 arranged in nanotube 3. Carbon nanotube 3 is obtained in controlled manner by catalytic means, i.e. from a catalyst particle 5 formed beforehand on substrate 2. Indeed, diameter D of catalyst particle 5 used to grow the nanotube is substantially equal to diameter D of nanotube 3, which is itself proportional to diameter $d_r$ of internal channel 4. It is thus possible to control diameter $d_r$ of internal channel 4 of a carbon nanotube 3 by producing a particle or a drop of catalyst 5 having a controlled predetermined size corresponding to that required for diameter D of carbon nanotube 3.

There are two major methods for obtaining a catalyst particle 5 having a predetermined size.

As reported in the article "Novel approach to fabricating carbon nanotube via interconnects using size-controlled catalyst nanoparticles" by Shintaro Sato et al. (International Interconnect Technology Conference, 2006, pages 230-232), one of the methods consists in forming particles of catalyst by laser ablation of a catalyst target in selecting the particles corresponding to the required size from among the particles formed and in depositing the selected particles.

As illustrated in FIGS. 1 to 4, another method consists in depositing a thin film of catalyst 6 on a predetermined area of the free surface 2a of substrate 2 (FIG. 2) and in then performing high-temperature annealing.

Figure 3:
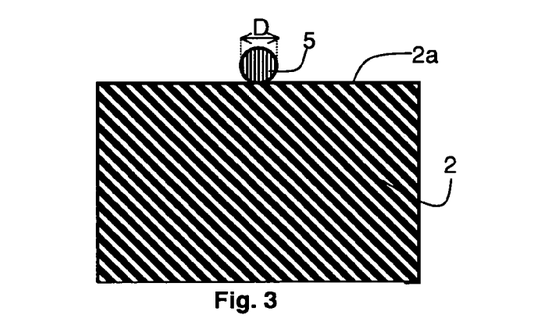

The thin film of catalyst 6 is for example formed by a catalyst chosen from nickel, iron, cobalt and an alloy of several of these chemical elements or by several distinct layers each formed by a catalyst chosen from nickel, iron, cobalt and an alloy of several of these chemical elements. It can be deposited by any type of known means. It is for example deposited by physical vapor deposition, by plasma sputtering by means of a target containing the catalyst, by evaporation of a target containing the catalyst or by heating, in particular electronic (bombardment). As represented in FIG. 3, high-temperature annealing is then performed to transform the thin film into a drop or a particle 5. Annealing of the thin film, once the latter has been deposited on the substrate, can be performed by any suitable heating means such as a resistance, a lamp or an electrically conducting filament. The annealing temperature is advantageously comprised between 400° C. and 1000° C. and advantageously between 400° C. and 550° C.

The diameter D of a catalyst particle 5 achieved by deposition of a thin film and annealed is mastered by previously determining the dimensions of the initially deposited thin film 6, as indicated in the article "Plasma enhanced chemical vapour deposition carbon nanotubes/nanofibres—how uniform do they grow?" by K B J Teo et al. (Institute of Physics Publishing, Nanotechnology 14 (2003) 204-211). The diameter D does in fact depend not only on the height but also on the width of the previously deposited thin film 6. Moreover, if there is no diffusion of the catalyst in substrate 2, the volume of drop 5 corresponds to the initial volume of thin film 6.

For example, it is possible to form a thin film 6 of catalyst having a width for example of more than 80 nm, on surface 2a of substrate 2, by means of an inexpensive lithography step using the mercury line I or a deep UV radiation, and to then perform shaping by annealing catalyst particle 5. This particle 5 then has a diameter D proportional to the size of previously deposited thin film 6 of catalyst. A thin film with a width of 100 nm and a height of 3 nm enables for example a particle having a diameter D of about 30 nm to be obtained. Moreover, the dimensions of thin film 6 of catalyst can also be adjusted by lithography, etching, or stripping. They can also be determined, before deposition of the thin film of catalyst, by depositing a layer of aluminum on the part of the free surface 2a of substrate 2 designed not to be covered by thin film 6. These techniques are advantageously used when the device comprises a plurality of nanotubes. When a single carbon nanotube 3 is formed on the free surface 2a of substrate 2, thin film 6 of catalyst is advantageously of cylindrical shape with a diameter of less than 150 nm.

Figure 4:
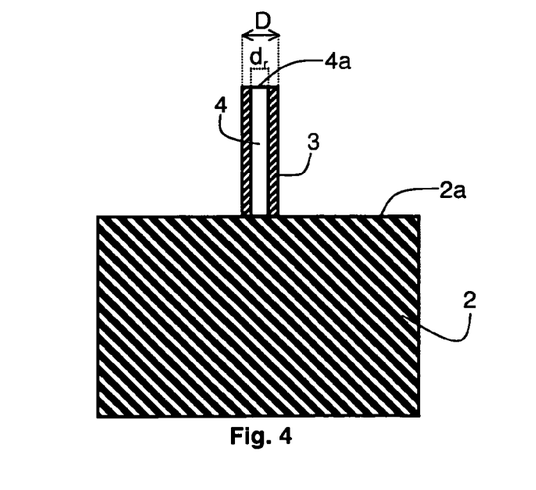

As represented in FIG. 4, formation of catalyst particle 5 is followed by a growth step of carbon nanotube 3 in which internal channel 4 is arranged. Growth is advantageously achieved by chemical vapor deposition (CVD) or by plasma-enhanced chemical vapor deposition (PECVD), in particular a radiofrequency or microwave plasma. On completion of the growth step, the catalyst, previously arranged on free surface 2a of substrate 2, is in general located at the free end of the carbon nanotube (tip growth) before being eliminated to release the free end of the nanotube and therefore opening 4a of internal channel 4. The catalyst can for example be dissolved by a chemical treatment step with $HNO_3$.

Figure 5:
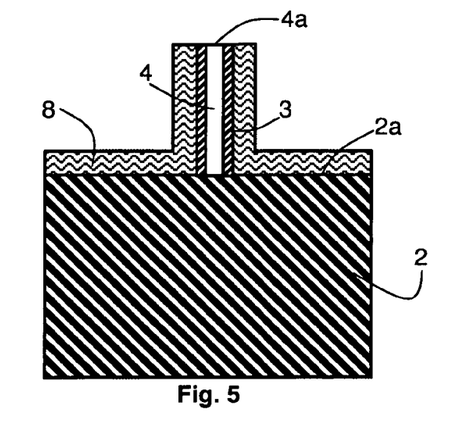
Figure 6:
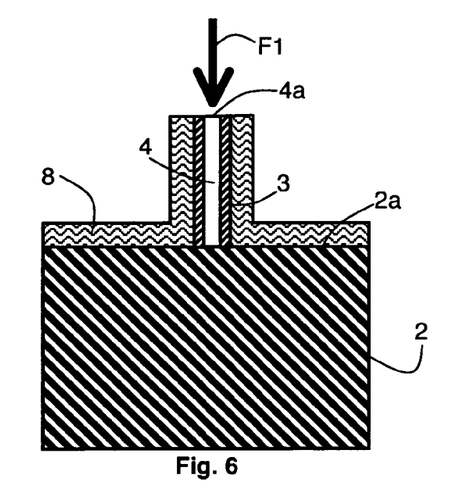
Figure 7:
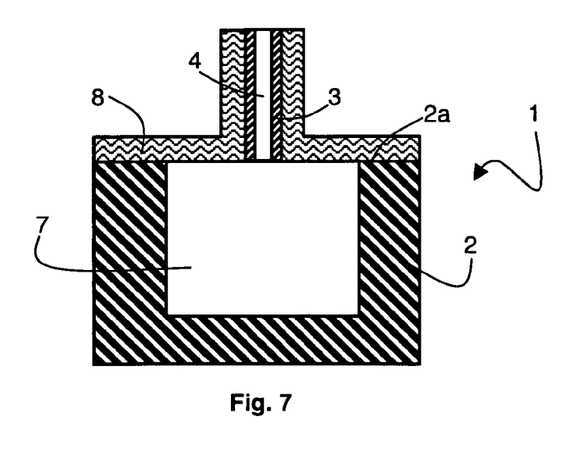

Once carbon nanotube 3 has been formed on free surface 2a of substrate 2, circulation channel 7 is produced as represented in FIGS. 5 to 7 by means of a chemical agent (for example hydrofluoric acid) enabling a predetermined area of substrate 2 to be selectively degraded.

A thin layer 8 impermeable to the chemical agent is previously deposited on the whole of free surface 2a of substrate 2 and on the walls of carbon nanotube 3 in order to protect the latter from the chemical agent. Furthermore, thin layer 8 must not block off opening 4a of internal channel 4 of carbon nanotube 3. A chemical mechanical polishing step can for example be performed before formation of circulation channel 7 to release opening 4a of internal channel 4 if the latter is obstructed or to shorten nanotube 3.

As represented by arrow F1 in FIG. 6, the chemical agent is then introduced into internal channel 4 of nanotube 3 via opening 4a to come into contact in very localized manner with substrate 2 and to selectively degrade a predetermined area of substrate 2 arranged under the nanotube and designed to form circulation channel 7 (FIG. 7). Introducing a chemical agent in the internal channel of a carbon nanotube to selectively degrade an area of the degradable material substrate has been described previously in French Patent application n° 0703487 filed on May 15, 2007 for fabricating air gaps in a target layer, designed to be integrated in a metal interconnection structure.

Thin layer 8 impermeable to the chemical agent can advantageously be kept on the free surface 2a of substrate 2 and on the free surface of nanotube 3.

A fabrication method as represented in FIGS. 1 to 7 presents the advantage of being easy to implement and proves to be inexpensive, thereby making industrialization viable. At least one channel of nanometric size (internal channel of a nanotube) opening out automatically onto a circulation channel, for example of micrometric width, can be obtained simply by means of this method without requiring several delicate and fastidious steps of lithography, etching and such like. In the prior art, to achieve precise dimensional control of patterns of around ten nanometers, costly lithography methods have to be set up. According to the invention however, the size of the internal channel or channels is controlled and determined by the size of the initial catalyst particle, possibly using a lithography step that does not require tuning as it is already used in industrial manner. Furthermore, this method is performed at relatively low temperature, in particular in comparison with the method according to the prior art for obtaining a nanoporous membrane.

Finally, such a method also enables a separation device comprising several nanotubes to be produced in a very simple, reproducible and controlled manner. Thus, when several nanotubes are formed at surface 2a of substrate 2, the chemical agent is introduced in the different internal channels of the nanotubes and selectively degrades areas of substrate 2, advantageously in the form of air gaps that are joined in twos to form the circulation channel. The inlet and outlet holes of the circulation channel, where applicable, can also be achieved by means of the chemical agent introduced into a nanotube near to a side wall of the substrate. The chemical agent then selectively degrades an area of said side wall to form a hole. The holes, if present, can also be made mechanically by lithography and etching or by splitting.

Figure 8:
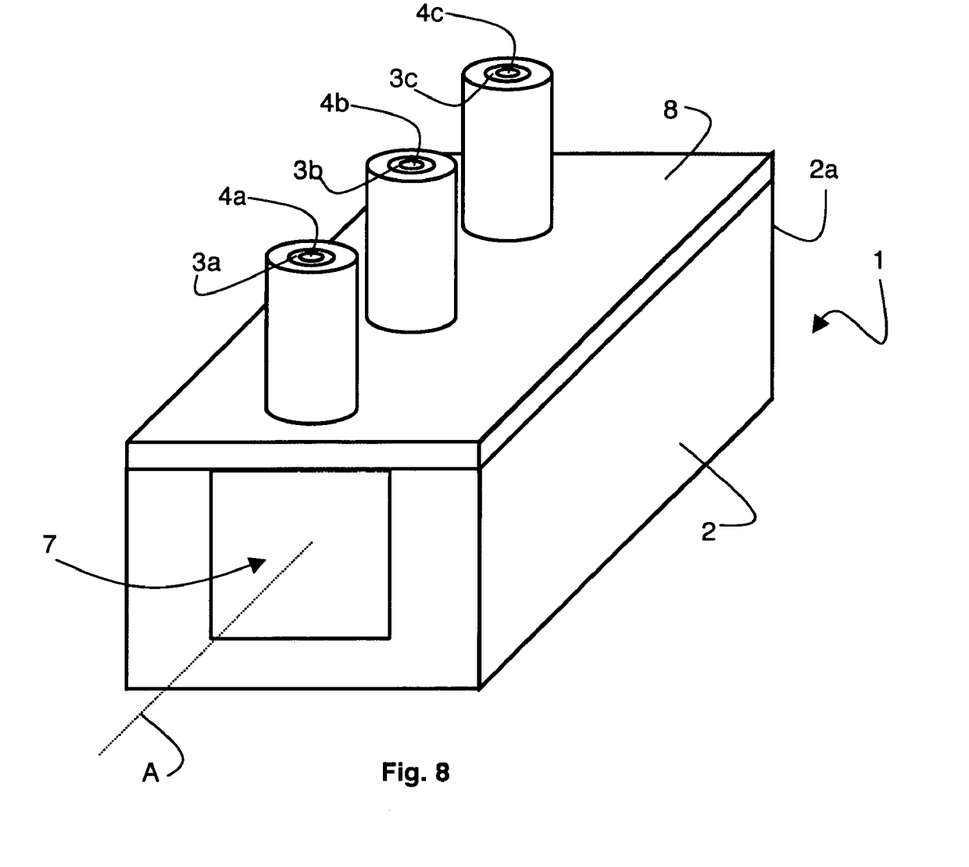
FIG. 8 schematically represents a perspective view of the separation device according to FIG. 7.

For example, the separation device can comprise several nanotubes for separating one and the same molecule. These nanotubes then form a series of nanotubes associated with a predetermined molecule. In FIG. 8, separation device 1 for example comprises a series of three identical carbon nanotubes 3a, 3b, 3c formed on free surface 2a of substrate 2 and, like free surface 2a, covered by material impermeable to the chemical agent. Nanotubes 3a, 3b, 3c each comprise an internal channel 4a, 4b, 4c, opening out into circulation channel 7 and internal channels 4a, 4b, 4c all have the same diameter $d_r$. The arrangement of nanotubes 3a, 3b and 3c is in particular such that the respective intersection points of their axes of symmetry with the plane of the free surface of thin layer 8 are aligned along an axis parallel to the longitudinal axis A of circulation channel 7. Such an arrangement of carbon nanotubes forms a particular case of parallel assembly, as all the nanotubes of the same series open out into the same circulation channel 7.

Figure 9:
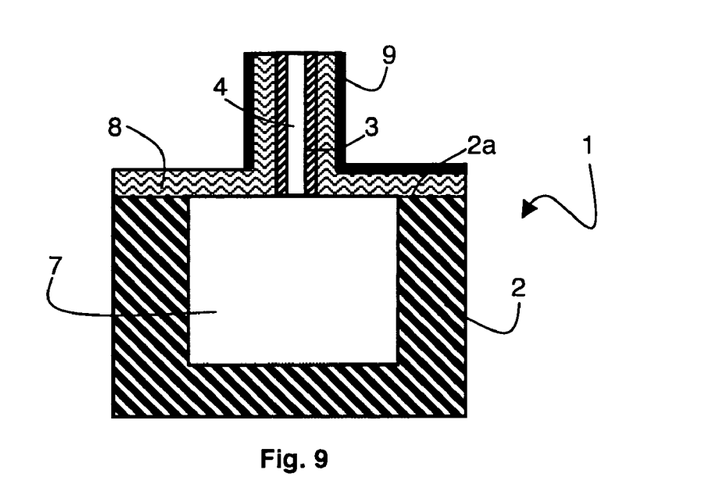
FIG. 9 schematically represents an alternative embodiment of a separation device according to FIG. 7, in cross-section.

In the case of carbon nanotubes, as the latter are electrically conducting, they can advantageously be subjected to an electric potential (address signal) in order to create molecular valves. FIG. 9 represents a separation device 1 with a carbon nanotube 3 partly covered by an electrically conducting material such as gold, titanium nitride, palladium, platinum, iron or aluminum. A carbon nanotube 3 is thereby at least partly covered by an electrically conducting material 9. Furthermore, in FIG. 9, the free surface of carbon nanotube 3 is previously covered by a thin layer 8 of material impermeable to the chemical agent, said layer then being used when circulation channel 7 is produced. Electrically conducting material 9 is thus arranged, in this embodiment, on thin layer 8 of material impermeable to the chemical agent. Electrically conducting material 9 can be deposited all around carbon nanotube 3 previously coated by thin layer 8 of material impermeable to the chemical agent or on a part thereof only.

Coating of at least a part of carbon nanotube 3 by an electrically conducting material 9 makes it possible to act electrostatically on whether molecules pass or not and to thereby obtain molecular valves. Such an electrically conducting material 9 thus enables an electrical connection to be made around at least one internal channel 4 to control the passage of molecules in the manner of a biological transistor.

Furthermore, separation device 1 can also comprise nanotubes having internal channels of different dimensions, which enables several separations to be performed in sequence. For example, a mixture of proteins of increasing or decreasing size can be extracted sequentially. The fabrication method of the separation device may then require one or more lithography steps, but these lithography steps remain relatively low-resolution steps, as the nanotubes are produced from thin films made from catalyst shaped as drops when annealing is performed.

The separation device may also comprise several distinct series of nanotubes. What is meant by distinct series is that each series comprises several nanotubes having internal channels of the same diameter $d_r$ and that diameter $d_r$ of the internal channels of a first series of nanotubes is different from that of the internal channels of a second series of nanotubes. Advantageously, the difference of diameter between the two series is at least equal to 2 nm.

Figure 10:
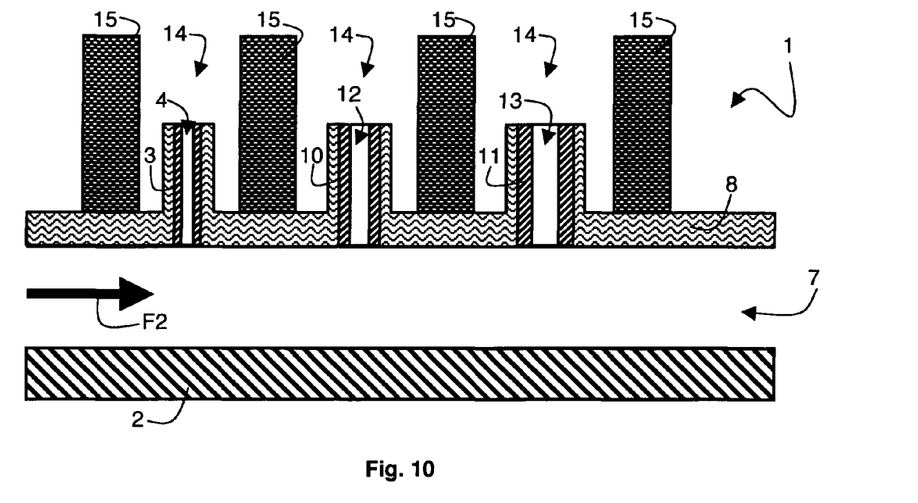
FIG. 10 schematically represents a second embodiment of a separation device according to the invention, in cross-section.

For example, in FIG. 10, a separation device 1 comprises three series of carbon nanotubes 3, 10, 11 having internal channels of 4, 12, 13 of three different diameters $d_r$, opening out into the same circulation channel 7. Each series of carbon nanotubes is associated with a predetermined molecule to be separated or to be extracted. Thus, the effective diameter of the internal channels of a particular series is larger than the hydrodynamic diameter of the corresponding molecule. Moreover, the internal channels of a particular series must not let molecules having a larger hydrodynamic diameter than that of the molecule associated with the series pass. The effective diameter of the internal channels of a particular series is thus smaller than the hydrodynamic diameter of the smallest of the molecules having a larger hydrodynamic diameter than the hydrodynamic diameter of the molecule associated with said series.

Furthermore, as represented in FIG. 10, the series of nanotubes are arranged in increasing order according to diameter $d_r$ of their internal channels, along the axis of circulation of the liquid sample in the circulation channel (arrow F2). In FIG. 10, if the liquid sample comprises three molecules of different hydrodynamic diameters to be extracted, the molecule of smallest hydrodynamic diameter will be extracted by the series of nanotubes 3, the molecule of intermediate hydrodynamic diameter will be extracted by the series of nanotubes 10 and the molecule of largest hydrodynamic diameter will be extracted by the series of nanotubes 11 arranged downstream from circulation channel 7.

Furthermore, in FIG. 10, each series of nanotubes can also be arranged in an external groove 14 delineated by the free surface of thin layer 8 of material impermeable to the chemical agent and by side walls 15 previously formed on said impermeable layer 8. Such a groove 14 can form an additional circulation channel. As mentioned above, the diameter D of a particle of catalyst can depend on the height and on the width of the deposited thin film 6. The width of the deposited thin film is delineated by the distance separating two side walls 15. So, the width of the external groove 14, which is equal to the distance between two adjacent side walls 15, can be used to define the diameter of the particle of catalyst, i.e. can be used to define the internal diameter of the corresponding nanotubes.

Figure 11:
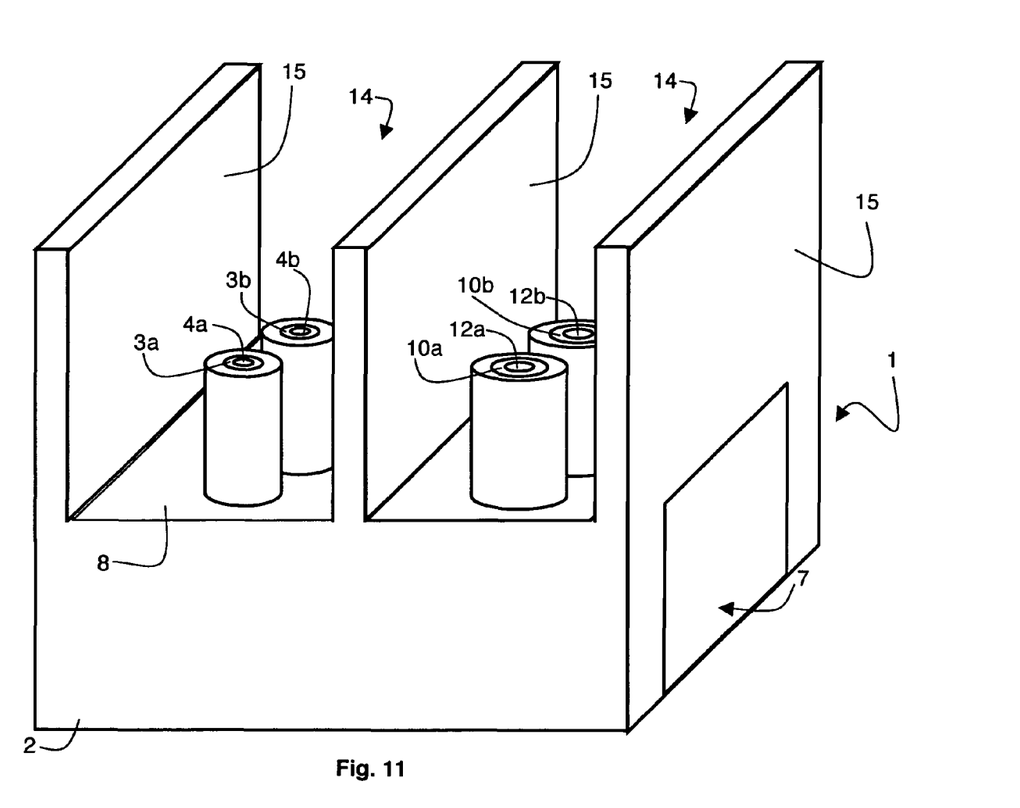
FIG. 11 schematically represents a third embodiment of a separation device according to the invention, in cross-section.

Likewise FIG. 11 represents two series of nanotubes 3a, 3b and 10a, 10b comprising internal channels 4a, 4b and 12a, 12b each comprising a hole opening out into one and the same circulation channel 7. Three side walls 15 are arranged in parallel on the free surface of thin layer 8 of material impermeable to the chemical agent. They are further arranged in planes arranged in a direction perpendicular to the direction of flow in circulation channel 7. Two adjacent side walls 15 thus delineate a groove 14 with the free surface of thin layer 8, a series of nanotubes 3a, 3b or 10a, 10b being arranged in said groove. Walls 15 can be fabricated before the nanotubes are formed to delineate distinct series of thin films 6 of catalyst used to form the nanotubes. Side walls 15 are for example formed by a biocompatible material such as PMMA. Thus, in such a device, grooves 14 also form circulation channels. When the side walls are formed before deposition of the thin film 6 et thus before growth of the nanotubes, the distance separating the side walls enables the diameter D of the particle of catalyst and therefore the internal diameter of nanotubes to be defined. Advantageously, it is possible to lie the diameter of the nanotube to the distance between side walls 15. From that point of view, a separation according to the size of the molecule of the liquid sample can realized as a function of the distance between side walls 15.

In the separation devices represented in FIGS. 10 and 11, the liquid sample containing the molecules to be separated can flow in grooves 14 or in circulation channel 7. For example, in the separation device represented in FIG. 11, the liquid sample can flow in circulation channel 7, and the different molecules to be separated are then sorted and separated at different places according to their hydrodynamic diameter and their size to then be recovered once sorted on outlet of internal channels 4, 12 of carbon nanotubes 3, 10 in grooves 14.

Figure 12:
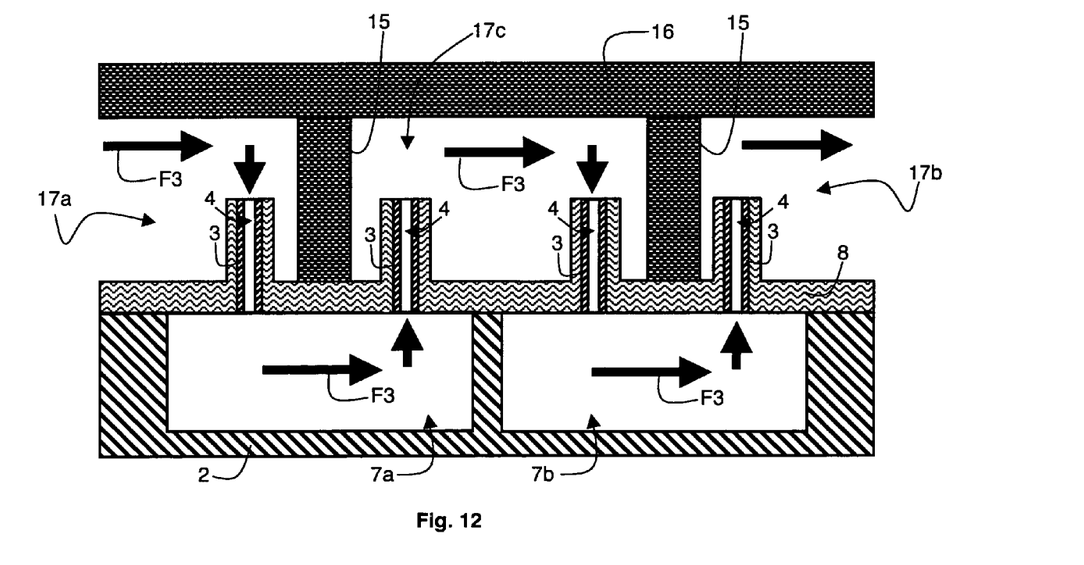
FIG. 12 schematically represents a fourth embodiment of a separation device according to the invention, in cross-section.

As illustrated by another embodiment represented in FIG. 12, the nanotubes of a series can also form a serial assembly in order to increase the purity of the extracted molecule. In such a serial assembly, several circulation channels are connected in series by means of the internal channels of nanotubes of the same diameter $d_r$. For example, in FIG. 12, five circulation channels are connected in series by means of four internal channels 4 of nanotubes 3, formed on surface 2a of substrate 2. The five circulation channels are formed by first and second circulation channels 7a and 7b arranged in substrate 2 and by three additional channels arranged above said substrate 2. Thus, with the free surface of thin layer 8 of material impermeable to the chemical agent and a top wall 16, two side walls 15 delineate two peripheral additional circulation channels 17a and 17b and an intermediate additional circulation channel 17c. Two nanotubes 3 respectively opening out into the first and second circulation channels 7a and 7b are respectively arranged in peripheral circulation channels 17a and 17b. Intermediate circulation channel 17c further comprises two nanotubes respectively opening out into the first and second circulation channels 7a and 7b. Arrows F3 indicate in FIG. 12 the direction of flow of a liquid sample in such a separation device.

Several separation devices, either single or multiple, can also be associated to refine the separation process. Moreover, the different embodiments described above can be associated. Thus, the embodiment represented in FIG. 9 can be associated with the embodiment represented in FIG. 10 or in FIG. 11. In this case, certain nanotubes may be previously polished before being partly covered by a polarizable electrode.

A separation device according to the invention can advantageously be used as dialysis membrane, for separation of proteins for biology or analytical chemistry.

The nanotubes can also be nanotubes made from a material chosen from $TiO_2$, BN, MoS, WS, CUS, $NiCl_2$, CdCl, CdI, AsS, AlSiGeO and metal oxides, provided that the material is compatible with the chemical agent used for selectively degrading the substrate.

It is not mandatory to eliminate the catalyst that at least partially obstructing the superior end of the nanotubes. Side walls of the nanotubes are not in fact always water tight and it is possible that for example molecules pass through graphene sheets of a carbon nanotube.

The invention claimed is:

1. A separation device comprising:
   a substrate;
   an impermeable layer located on the substrate;
   a first circulation channel arranged in the substrate with an input and an output, the impermeable layer forming a wall of the first circulation channel;
   a second circulation channel having at least an output, and is separated from the first circulation channel and the substrate by the impermeable layer;
   a third circulation channel, different from the second circulation channel, having at least an output, and is separated from the first circulation channel and the substrate by the impermeable layer;
   a first nanotube with a first internal channel connecting the first circulation channel to the second circulation channel through the impermeable layer, the first nanotube having a first effective diameter; and
   a second nanotube with a second internal channel connecting the first circulation channel to the third circulation channel through the impermeable layer, the second nanotube having a second effective diameter that is larger than the first effective diameter.

2. The device according to claim 1, wherein the first nanotube and the second nanotube are made from a material selected from the group consisting of carbon, $TiO_2$, BN, MoS, WS, CUS, $NiCl_2$, CdCl, CdI, AsS, AlSiGeO, and metal oxides.

3. The device according to claim 1, wherein the first nanotube and the second nanotube are arranged in increasing order according to their effective diameters, along a line connecting the input to the output of the first circulation channel.

4. The device according to claim 1, wherein the first effective diameter is a first actual diameter and the second effective diameter is a second actual diameter, the second actual diameter being larger than the first actual diameter.

5. The device according to claim 1, wherein the first nanotube and the second nanotube are covered by an electrically conducting material.

6. The device according to claim 5, wherein the first nanotube and the second nanotube have a same actual diameter.

7. The device according to claim 1, wherein a line connecting the input to the output of the first circulation channel is parallel to the axis of flow of the liquid sample in the third circulation channel.

8. The device according to claim 1, wherein a line connecting the input to the output of the first circulation channel is perpendicular to the axis of flow in the second and third circulation channels.

9. A device comprising:
   a substrate;
   a first circulation channel arranged in the substrate;
   a second circulation channel separated from the substrate by a first layer;
   a third circulation channel arranged in the substrate and separated from the second circulation channel by the first layer, where the first circulation channel is different from the third circulation channel;
   a first nanotube connecting the first circulation channel to the second circulation channel through the first layer;
   a second nanotube connecting the second circulation channel to the third circulation channel through the first layer,
   wherein the first, second, and third circulation channels are arranged so as to cause flowing of a fluid from the first circulation channel to the second circulation channel and from the second circulation channel to the third circulation channel.

10. The device according to claim 9, wherein the second circulation channel is defined by two side walls formed on the first layer and a top wall opposite to the first layer.

11. The device according to claim 9, wherein the first nanotube and the second nanotube have a same actual diameter.

* * * * *